US012208550B2

(12) United States Patent
Baranowski et al.

(10) Patent No.: US 12,208,550 B2
(45) Date of Patent: Jan. 28, 2025

(54) METHOD FOR PRODUCING A SUPPORT AND MOTOR VEHICLE SUPPORT

(71) Applicant: Ford Global Technologies, LLC, Dearborn, MI (US)

(72) Inventors: Thomas Baranowski, Wurselen (DE); Maik Broda, Wurselen (DE); Markus Franzen, Stolberg (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 758 days.

(21) Appl. No.: 17/243,862

(22) Filed: Apr. 29, 2021

(65) Prior Publication Data

US 2021/0354347 A1    Nov. 18, 2021

(30) Foreign Application Priority Data

May 13, 2020   (DE) .......................... 102020206028.2

(51) Int. Cl.
*B29C 45/00* (2006.01)
*B29C 44/42* (2006.01)
*B29K 33/00* (2006.01)
*B29L 31/30* (2006.01)

(52) U.S. Cl.
CPC .......... *B29C 45/0053* (2013.01); *B29C 44/42* (2013.01); *B29C 45/0001* (2013.01); *B29C 2045/0079* (2013.01); *B29K 2033/26* (2013.01); *B29L 2031/3008* (2013.01)

(58) Field of Classification Search
USPC ............ 296/193.01, 70, 192, 187.01, 193.02
See application file for complete search history.

(56) References Cited

U.S. PATENT DOCUMENTS

| | | | |
|---|---|---|---|
| 4,131,701 A * | 12/1978 | VanAuken | B29D 23/00 138/143 |
| 5,090,034 A * | 2/1992 | Ganza | G01R 23/10 377/28 |
| 5,545,361 A | 8/1996 | Rosasco | |
| 7,270,209 B2 * | 9/2007 | Suess | B60K 15/03006 224/538 |
| 9,493,192 B2 * | 11/2016 | Baudard | B62D 25/145 |
| 9,643,380 B2 * | 5/2017 | Oyabu | B32B 27/34 |
| 10,723,055 B2 * | 7/2020 | Kuwabara | C08J 9/141 |
| 11,180,200 B2 * | 11/2021 | Baranowski | B62D 29/008 |

(Continued)

FOREIGN PATENT DOCUMENTS

EP      0960753 A2    12/1999
KR   101703781 B1 *   2/2017

(Continued)

*Primary Examiner* — Joseph D. Pape
*Assistant Examiner* — Veronica M Shull
(74) *Attorney, Agent, or Firm* — Vichit Chea; Price Heneveld LLP

(57) ABSTRACT

A method for producing a support for a motor vehicle, in particular a dashboard support, comprises the following steps: producing a core from a foam material and at least partially surrounding the core with a unidirectional layer to form a reinforced core. A resulting support for a motor vehicle has a core made of a foam material, wherein the core is at least partially provided with a unidirectional layer.

16 Claims, 5 Drawing Sheets

(56) References Cited

U.S. PATENT DOCUMENTS

| | | | | |
|---|---|---|---|---|
| 2009/0202761 A1* | 8/2009 | Malek | ............... | B62D 29/001 |
| | | | | 264/249 |
| 2015/0251707 A1* | 9/2015 | Keller | ............... | B62D 29/041 |
| | | | | 428/189 |
| 2015/0284035 A1* | 10/2015 | Reese | ............... | B29C 66/7392 |
| | | | | 264/103 |
| 2017/0158252 A1* | 6/2017 | Milne | ............... | B29C 70/465 |
| 2021/0354762 A1* | 11/2021 | Choi | ............... | B62D 65/00 |

FOREIGN PATENT DOCUMENTS

| | | | |
|---|---|---|---|
| KR | 101797460 B | * | 11/2017 |
| WO | 2013085723 A1 | | 6/2013 |

* cited by examiner

US 12,208,550 B2

METHOD FOR PRODUCING A SUPPORT AND MOTOR VEHICLE SUPPORT

CROSS-REFERENCE TO RELATED APPLICATION

This application claims foreign priority benefits under 35 U.S.C. § 119(a)-(d) to German Application No. 102020206028.2 filed May 13, 2020, which is hereby incorporated by reference in its entirety.

FIELD OF THE DISCLOSURE

The present disclosure generally relates to a method for producing a support for a motor vehicle and further relates to a support for a motor vehicle, such as, a dashboard support which is arranged in the interior of a motor vehicle and serves, for example, for the attachment of a steering wheel.

BACKGROUND OF THE DISCLOSURE

In practice, various types of supports such as, for example, dashboard supports are employed on motor vehicles. The dashboard supports are usually made entirely of metal or are designed as metal-plastic hybrid components.

WO 2013/085723 A1 discloses a method for producing a composite article from unidirectional fiber-reinforced tape (UD tape). A self-contained preform of the article is produced by winding a plurality of layers of UD tape. The layers are secured on one another during the winding process. In a subsequent step, the stacked tape layers are heated and applied with pressure in a press mold in order to firmly connect the layers to one another. Finally, the preform can be overmolded.

It would be desirable to provide a method for producing a motor vehicle support at a reduced cost and a motor vehicle support which achieves a high mechanical rigidity of the support.

SUMMARY OF THE DISCLOSURE

According to a first aspect of the present disclosure, a method for producing a support for a motor vehicle is provided. The method includes the steps of producing a core from a foam material, and at least partially surrounding the core with a unidirectional layer to form a reinforced core.

According to a second aspect of the present disclosure, a method for producing a support for a motor vehicle is provided. The method includes the steps of producing a core from a foam material by injection molding, at least partially surrounding the core with a unidirectional layer to form a reinforced core, arranging additional elements on the reinforced core, and overmolding to secure the additional elements onto the reinforced core.

According to yet another aspect of the present disclosure, a support for a motor vehicle is provided. The support including a core made of a foam material, and a unidirectional layer at least partially surrounding the core to form a reinforced core.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
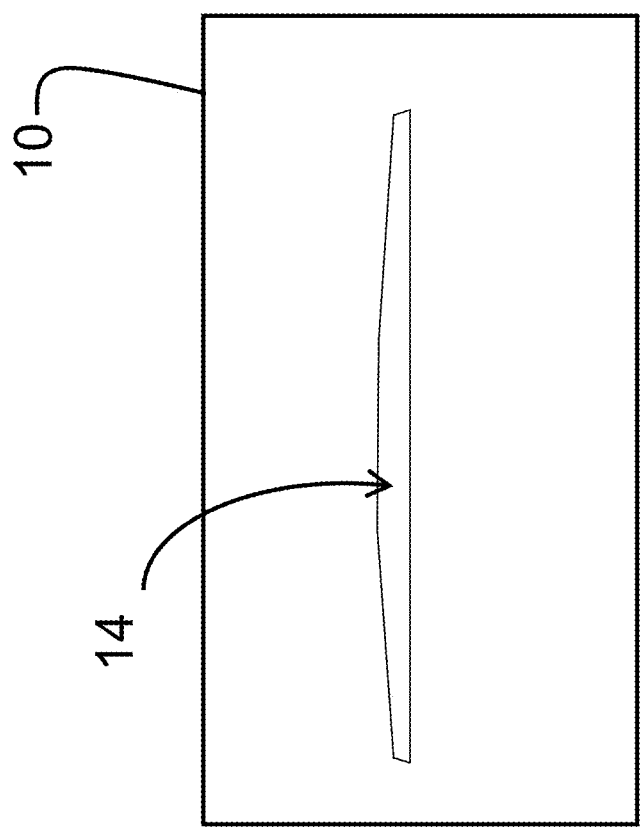
FIG. 1 is a schematic view of an injection mold showing a production step of a method for producing a support for a motor vehicle, according to one embodiment.

In the various figures, identical parts are always provided with the same reference numerals, so that such parts are generally also only described once.

FIGS. 1-4 show various production steps of a method for producing a support 26 for a motor vehicle, according to an exemplary embodiment. In the example shown and described herein, the motor vehicle support 26 is a dashboard support configured for use on a motor vehicle. The support 26 is shown only schematically in the figures under consideration in order to illustrate the individual method steps. FIG. 5 shows a conventionally manufactured support 26 in the form of a dashboard support configured for use on a motor vehicle.

Figure 2:
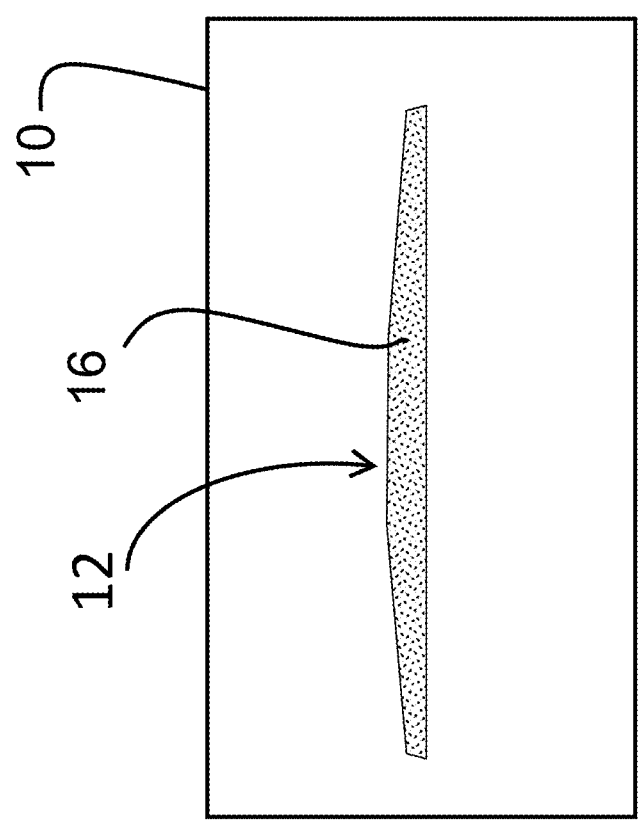
FIG. 2 is a schematic view of the injection mold showing a further production step of the method.

FIG. 1 shows an injection mold 10 for producing a core 12 as seen in FIG. 2 by use of injection molding. The injection mold 10 has a cavity 14 which is filled in a next method step, shown in FIG. 2, with a foam material 16, such as, for example, polymethacrylimide (PMI). The foam material 16 is shown by dotted lines in the drawing FIGS. 2 and 3. The foam material 16 is then allowed to cure in the injection mold 10.

Figure 3:
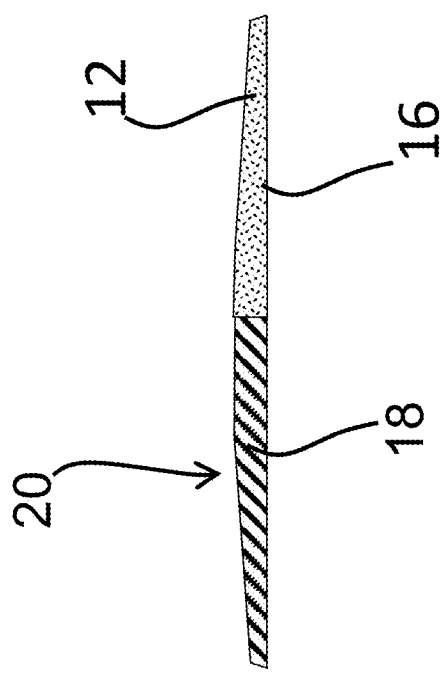
FIG. 3 is a schematic view of a reinforced core removed from the injection mold showing a further production step of the method.

After the foam material 16 has cured, the core 12 which has now been formed is removed from the injection mold 10 and wrapped with a unidirectional fiber-reinforced tape, such as UD tape 18, in accordance with the method step shown in FIG. 3, so that a reinforced core 20 is formed. It can be seen in FIG. 3 that only about half of the core 12 is wrapped with the UD tape 18 in this illustration.

Figure 4:
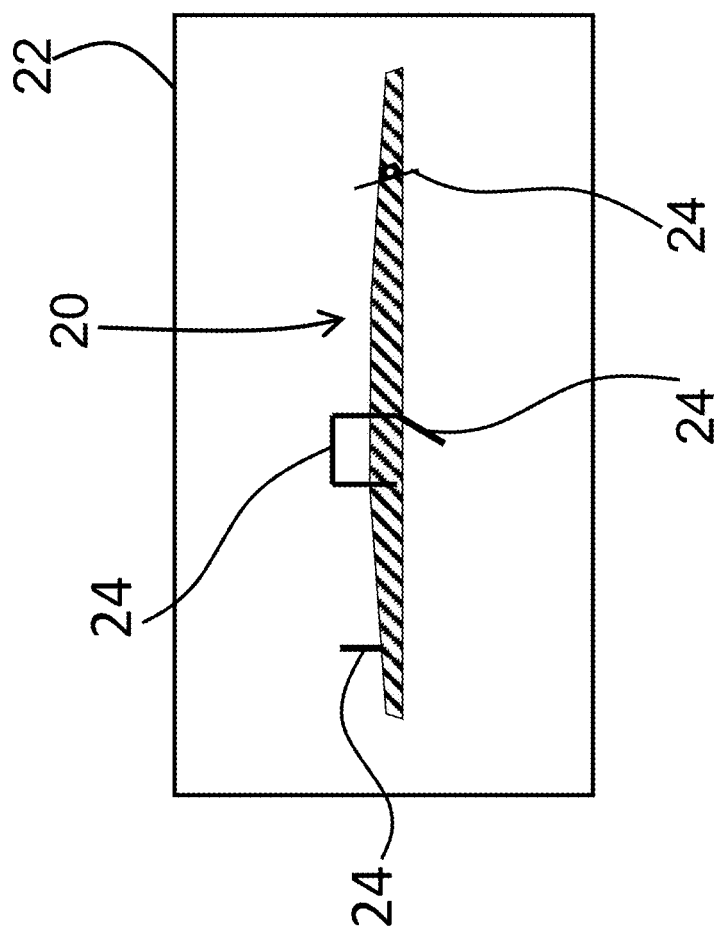
FIG. 4 is a schematic view of the reinforced core inserted into another injection mold showing a final production step of the method.
Figure 5:
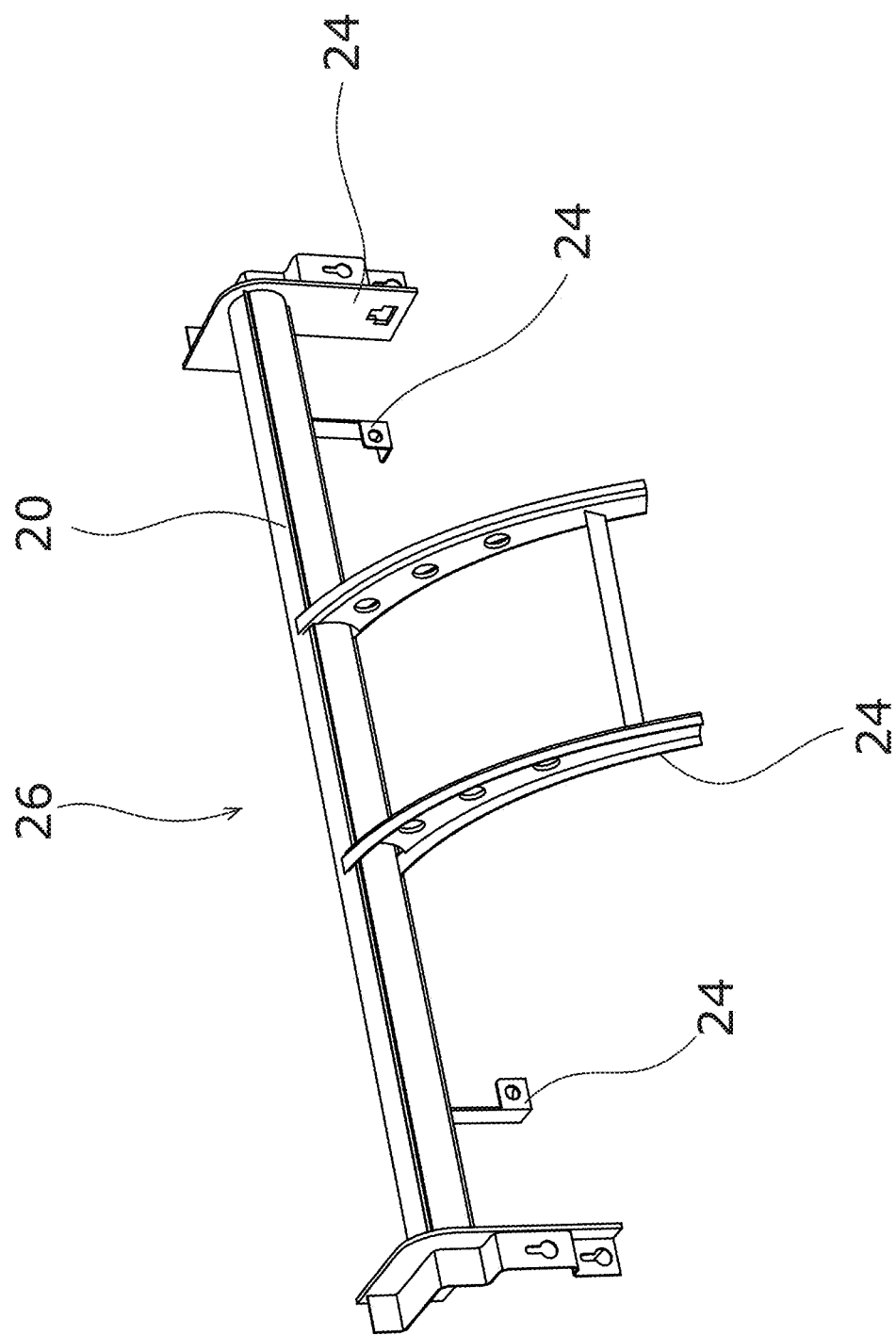
FIG. 5 is a perspective view of a motor vehicle dashboard support according to one example.

FIG. 4 shows the finished reinforced core 20, which is completely wrapped with UD tape 18. The reinforced core 20 is inserted into a further injection mold 22, wherein various additional elements 24 may be introduced into the injection mold 22 as well. The additional elements 24 may include fastening structures such as clamps, clips, inserts, etc. that may be used to attach further functional elements to the support 26. In order to connect these additional elements 24 to the reinforced core 20, they are overmolded with thermoplastic material.

FIG. 5 illustrates a conventionally manufactured support 26 in the form of a dashboard support configured for use in a motor vehicle. The dashboard support 26 is configured to be arranged in an interior of a motor vehicle, and the various additional elements 24 serve for the attachment of a steering wheel, an airbag and various items of equipment.

The disclosure provides a method for producing a support, in particular a dashboard support, for a motor vehicle. The method comprises the following steps of producing a core from a foam material, and at least partially surrounding the core with a unidirectional layer to form a reinforced core.

The production of the core from a foam material represents an inexpensive solution for initially creating a kind of "base element" for the support. Moreover, a core made of a foam material is particularly light in weight in comparison with cores or supports made of metal. The properties of the foam material can be varied over a wide range, thus enabling the core made of the foam material to be optimized for various applications and then, for example, to be adapted quickly and inexpensively for various vehicle types with requirements that differ only slightly from one another. Moreover, the core of foam material offers the possibility of integrating cavities or conduits therein.

Although the core itself already has a certain rigidity, in some examples, it may not be sufficient to meet the requirements of a support and in particular of a dashboard support for a motor vehicle. To improve rigidity, the core is at least partially surrounded by a unidirectional layer (UD layer). In this context, the unidirectional layer is a layer which has fibers that are all oriented parallel to one another and in one direction. Such layers have a particularly high rigidity in the direction of the fibers. Accordingly, a UD layer can be arranged in those selected regions of the core in which an increase in rigidity is required. Consequently, the use of material in the UD layer can be kept low, which also correspondingly permits lower production costs.

In one practical embodiment of the method, the unidirectional layer is a tape. In this context, a thin, elongate strip is referred to as a tape. A unidirectional fiber-reinforced (UD) tape of this kind is usually also referred to as a "UD tape." The tape has, in particular, unidirectionally oriented fibers which are embedded in a matrix of a polymer. The tape offers the advantage that the tape is easy to make up and is likewise easy to apply to the core, particularly when the tape can be unwound from a roll. Moreover, such tapes are easy to overmold.

The tape can be arranged on the core in a simple manner. In particular, the tape can be laid on the core according to one example. In this example, the tape can be laid in one or more layers one on top of the other on the core. Alternatively or in addition to this example, the tape can be wound around the core in another example. In particular, the individual layers of the tape can be laid on top of one another with a slight overlap during winding. In particular, the tape may be applied in an automated manner by use of automated tape placing (ATP), which offers an efficient way of reinforcing the core with a UD tape. It should be emphasized once again that it is also possible for the core to be provided only partially with the UD tape, namely in the regions in which reinforcement of the core is required.

For better adhesion of the unidirectional layer to the core, the unidirectional layer can be adhesively bonded to the core. If the UD layer is in the form of a tape, one particularly advantageous possibility is for the tape to be self-adhesive. Alternatively, an adhesive can be applied to the core and/or the layer or the tape.

In a further practical embodiment of the method for producing a support for a motor vehicle, the foam material for the core is a polymethacrylimide (PMI). This material already has a sufficiently high compressive strength. In this embodiment, foams having a compressive strength in the range of from 0.8 MPa to 15.8 MPa can be produced. A PMI foam material which has a compressive strength of 3.5 MPa to 5 MPa may be used here. The density of the foam can be in the range of from 32 kg/m³ to 110 kg/m³.

In one embodiment, the core is produced by injection molding in an injection mold. It is considered particularly advantageous here if the core composed of the material PMI described above is produced by use of injection molding in an injection mold. In this context, injection molding represents a comparatively simple and inexpensive process. Machining and subsequent processing steps can be dispensed with to the greatest possible extent or even completely in some examples.

In a further practical embodiment of the method for producing a support for a motor vehicle, after the production of the reinforced core, additional elements are arranged thereon. The additional elements are, in particular, fastening structures, such as clamps or clips or inserts, which in turn are used to attach further functional elements, such as a steering wheel, an airbag, etc., to the motor vehicle support.

In particular, the additional elements may be secured to the reinforced core by use of overmolding, such as by use of a thermoplastic material. In particular, these functional elements may be inserted completely or partially into an injection mold and then overmolded as described above and thus secured on the reinforced core. Here too, overmolding with plastic represents a comparatively simple and readily adaptable step.

The disclosure likewise relates to a support for a motor vehicle, wherein the support has a core made of a foam material, and wherein the core is at least partially provided with a unidirectional layer. Further additional elements can be arranged on the support and secured with thermoplastic material.

Such a support for a motor vehicle can be produced particularly easily and also inexpensively, this being achieved above all by use of the core of foam material. The necessary reinforcement of the core to meet the component requirements with regard to rigidity and strength can then be brought about in a targeted manner by use of the unidirectional layer. Such a support offers a large amount of design latitude since both the core of foam material is easily modifiable and reinforcement with the UD layer can be varied.

The support may be a dashboard support for a motor vehicle, according to one example. The dashboard support may serve as a transverse strut in the vehicle interior. The dashboard support may serve especially for the attachment of a steering wheel, airbag and other vehicle equipment.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for producing a dashboard support for a motor vehicle, the method comprising the steps of:
   producing an elongate core from a foam material;
   at least partially surrounding the elongate core with a unidirectional layer to form a reinforced elongate core, wherein the unidirectional layer comprises a unidirectional fiber-reinforced tape which has fibers embedded in a polymer and oriented parallel to one another and in one direction;
   arranging fastening structures along a length of the reinforced elongate core between first and second ends of the reinforced core; and
   overmolding the reinforced elongate core and the fastening structures with a thermoplastic material to couple the fastening structures with the reinforced elongate core.

2. The method according to claim 1, further comprising the step of layering the tape around the core.

3. The method according to claim 1, further comprising the step of winding the tape around the core.

4. The method according to claim 1, further comprising the step of adhesively bonding the unidirectional layer to the core.

5. The method according to claim 1, wherein the foam material for the core is a polymethacrylimide.

6. The method according to claim 1, wherein the step of producing the core comprises producing the core by injection molding.

7. A method for producing a dashboard support for a motor vehicle, the method comprising the steps of:
producing an elongate core from a foam material by injection molding;
at least partially surrounding the elongate core with a unidirectional layer to form a reinforced elongate core, wherein the unidirectional layer comprises a unidirectional fiber-reinforced tape which has fibers embedded in a polymer and oriented parallel to one another and in one direction;
inserting the reinforced elongate core into a secondary mold;
arranging fastening structures on a length of the reinforced elongate core between first and second ends of the reinforced elongate core; and
overmolding to secure the fastening structures onto the reinforced elongate core.

8. The method according to claim 7, further comprising the step of layering the tape around the core.

9. The method according to claim 7, further comprising the step of winding the tape around the core.

10. The method according to claim 7, further comprising the step of adhesively bonding the unidirectional layer to the core.

11. The method according to claim 7, wherein the foam material for the core is a polymethacrylimide.

12. A dashboard support for a motor vehicle, the support comprising:
a core made of a foam material via injection molding;
a unidirectional layer at least partially surrounding the core to form a reinforced core, wherein the unidirectional layer comprises a unidirectional fiber-reinforced tape which has fibers embedded in a polymer and oriented parallel to one another and in one direction; and
at least one fastening structure inserted partially within the core during the injection molding and coupled with a body of the reinforced core via overmolding of a thermoplastic material.

13. The method according to claim 7, further comprising:
inserting the foam material into a primary mold to form the elongate core via the injection molding.

14. The dashboard support according to claim 12, wherein the at least one fastening structure comprises at least one of a clamp, a clip and an insert.

15. The method according to claim 7, wherein the at least one fastening structure comprises at least one of a clamp, a clip and an insert.

16. The method according to claim 1, wherein the at least one fastening structure comprises at least one of a clamp, a clip and an insert.

* * * * *